United States Patent [19]
Gumm et al.

[11] Patent Number: 6,156,438
[45] Date of Patent: *Dec. 5, 2000

[54] MONOLITHIC POLYIMIDE LAMINATE CONTAINING ENCAPSULATED DESIGN AND PREPARATION THEREOF

[75] Inventors: Harrison V. Gumm, Lehigh, Fla.; Jeffrey A. Walisa, Stoutsville; Thomas E. Yeatts, Laurelville, both of Ohio

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/057,663

[22] Filed: Apr. 9, 1998

[51] Int. Cl.$^7$ ...................................................... B32B 15/08
[52] U.S. Cl. .......................... 428/458; 428/332; 428/336; 428/459; 428/473.5; 428/338
[58] Field of Search ..................................... 428/332, 337, 428/458, 473.5, 334, 336, 338, 459

[56] References Cited

U.S. PATENT DOCUMENTS

| | | | |
|---|---|---|---|
| 4,411,952 | 10/1983 | Sasaki et al. | 428/332 |
| 5,218,034 | 6/1993 | Milligan et al. | 524/399 |
| 5,227,244 | 7/1993 | Milligan | 428/458 |
| 5,262,227 | 11/1993 | Takabayashi et al. | 428/215 |
| 5,272,194 | 12/1993 | Arduengo et al. | 524/177 |
| 5,525,405 | 6/1996 | Coverdell et al. | 428/213 |
| 5,668,247 | 9/1997 | Furutani et al. | 528/353 |

FOREIGN PATENT DOCUMENTS

| | | | |
|---|---|---|---|
| 0411152A1 | 2/1991 | European Pat. Off. | B32B 33/00 |
| 8602569 | 5/1988 | Netherlands | H01L 49/00 |
| WO 99/03584 | 1/1999 | WIPO | B01L 3/00 |

*Primary Examiner*—Merrick Dixon

[57] ABSTRACT

A monolithic polyimide laminate without joints or seams, formed from polyimide layers containing from 400 to 10,000 ppm of tin without the use of an adhesive, and containing an encapsulated image design consisting of flow channels, ports, passageways, openings and windows for providing uninhibited flow of gases and/or fluids.

10 Claims, No Drawings

MONOLITHIC POLYIMIDE LAMINATE CONTAINING ENCAPSULATED DESIGN AND PREPARATION THEREOF

BACKGROUND OF THE INVENTION

The present invention relates to a monolithic all polyimide laminate containing an encapsulated image design consisting of flow channels, ports, passageways, openings and windows, and to a process for its preparation. The openings in the polyimide laminate provide uninhibited flow of gases and/or fluids. The openings can also be filled with metals or conductive inks thereby providing conductive flow through the openings. Attachments such as valves for providing flow control can also be included as part of the laminate design. The monolithic polyimide laminate can be used as a heat management system or radiator for lap top computers or as a micro fluids analyzer chamber.

The encapsulation of an image design in a polyimide substrate has customarily been made by etching a design in or on a center polyimide layer which is then sandwiched between two outer layers of stainless steel, or other substrates, using an adhesive bonding material. The demand for smaller and more intricate designs, however, cannot be achieved in constructions that require the use of adhesives. The adhesive disadvantageously flows into the designed artwork thereby inhibiting or obstructing the openings to the passage of gases or fluids.

Accordingly, a need exists for a monolithic polyimide laminate without joints or seams, formed without the use of an adhesive, and containing an encapsulated image design which provides uninhibited flow of gases and/or fluids.

SUMMARY OF THE INVENTION

According to the present invention, there is provided a monolithic polyimide laminate without joints and seams comprising first and second layers of polyimide film, said polyimide film layers having inner and outer surfaces, said inner polyimide film surfaces having image designs formed thereon, wherein said inner imaged polyimide film surfaces are directly bonded to each other in mirror relationship image against image without the use of an adhesive, thereby forming an encapsulated image design containing flow channels, passageways and openings for the passage of gases and/or fluids, and wherein said polyimide film layers contain from 400 to 10,000 ppm of tin.

In a further embodiment of the present invention, the above mentioned monolithic polyimide laminate can be prepared by the process of the present invention, comprising the steps of:

(a) providing first and second layers of polyimide film said layers having inner and outer surfaces;

(b) forming image designs on said inner polyimide film surfaces;

(c) superimposing said inner imaged polyimide film surfaces in mirror relationship image against image; and (d) bonding said inner imaged polyimide surfaces directly to each other using heat and pressure and without the use of an adhesive, thereby forming an encapsulated image design containing flow channels, passageways and openings for the passage of gases and/or fluids, and wherein said polyimide film layers contain from 400 to 10,000 ppm of tin.

DETAILED DESCRIPTION OF THE INVENTION

The monolithic polyimide laminate of the present invention comprises first and second layers of polyimide film which individually contain from 400 to 10,000 ppm, preferably from 1000 to 4000 ppm, and, most preferably from 1200 to 3500 ppm of tin as specifically disclosed in U.S. Pat. No. 5,525,405, which disclosure is incorporated herein by reference. Amounts of tin less than 400 ppm provide little improvement in adhesion properties, whereas amounts of tin greater than 10,000 ppm may adversely affect the mechanical properties of the polyimide film.

The polyimide film layers can be the same or they can be different and can have the same or different thicknesses. Preferably, the polyimide film layers consist of the same type of polyimide and have the same thickness. Alternately, the polyimide film layers may consist of the same type of polyimide and may have different thicknesses. Furthermore, the polyimide film layers may consist of different types of polyimides having the same or different thicknesses.

The polyimide films used in the monolithic polyimide laminate of the invention can be prepared by the polymerization and imidization reaction of an aromatic tetracarboxylic dianhydride component and an aromatic diamine component in an organic polar solvent, which process is well-known in the art, for example, as generally disclosed in U.S. Pat. Nos. 3,179,630 and 3,179,634.

A particularly preferred polyimide film for use in this invention is derived from pyromellitic dianhydride and 4,4'-diaminodiphenylether and contains from 1200 to 3500 ppm of tin.

Copolyimides derived from more than one tetracarboxylic dianhydride and more than one aromatic diamine can also be used. Particularly preferred copolyimides are those derived from 15 to 85 mole % of 3,3',4,4'-biphenyltetracarboxylic dianhydride, 15 to 85 mole % of pyromellitic dianhydride, 30 to 100 mole % of p-phenylenediamine and 0 to 70 mole % of 4,4'-diaminodiphenyl ether and are described in U.S. Pat. No. 4,778,872. A preferred copolyimide film for use in the present invention contains 40 mole % of 3,3',4,4'-biphenyltetracarboxylic dianhydride, 60 mole % of pyromellitic dianhydride, 60 mole % of p-phenylene-diamine and 40 mole % of 4,4'-diaminodiphenyl ether.

The tin-containing polyimide films can be prepared by introducing a minor amount of an organotin compound, such as bis-tributyltin oxide, as disclosed in U.S. Pat. No. 5,272,194 or a tin (II) or tin (IV) salt as disclosed in U.S. Pat. No. 5,218,034 into the film forming polyamic acid precursor solution or during polyamic acid polymerization. In addition, a tin metal salt solution can be coated on one or both sides of a partially cured polyamic acid gel film before final drying and curing to form the polyimide as described in U.S. Pat. No. 5,227,244.

The tin-containing polyimide films used in the monolithic polyimide laminate individually have a thickness of from 25 to 125 microns, preferably from 25 to 75 microns.

Image designs are formed on opposing inner facing surfaces of the two tin-containing polyimide films using conventional laser or chemical etching, drilling or machining techniques which are well-known in the art. The formation of the image design is limited only by the ability of one skilled in the art to control the etching process.

The two inner imaged tin-containing polyimide film surfaces are subsequently superimposed and symmetrically aligned in mirror relationship image against image thereby creating channels, vias, inlet and outlet ports etc. for the uninhibited or controlled flow of gases, fluids, conductive inks or metals.

The two inner imaged tin-containing polyimide film surfaces are bonded directly to each other, without the use of an adhesive, using heat and pressure to form a monolithic polyimide laminate containing an encapsulated image design. The design integrity is advantageously maintained throughout the heat and pressure treatment. Channels, vias, inlets and outlets remain unobstructed during heat and pressure bonding as compared to the use of conventional adhesives which inherently flow into the design area.

The heat-pressure bonding is preferably carried out at a temperature of from 418 to 441° C., preferably from 427 to 432° C., and at a pressure of from 250 to 450 psi, preferably from 325 to 375 psi, for from 5 to 15 minutes, preferably from 8 to 12 minutes.

The monolithic polyimide laminate of the invention has a thickness of from 12.5 to 175 microns, preferably from 75 to 125 microns.

The specific examples presented hereinbelow will serve to more fully explain how the present invention can be practically used. However, it should be understood that the examples are only illustrative and in no way limit the present invention.

EXAMPLE 1

Two, 125 microns thick Kapton® NA polyimide films, derived from pyromellitic dianhydride and 4,4'-diaminodiphenylether and containing 1200 ppm of tin, were chemically etched to form an image design 100 microns deep on the surface of each film. The image design included an inlet and an outlet, mixing islands and a connective hinge area.

The surfaces of the two etched films were superimposed and aligned in mirror relationship image against image. The etched area provided an enclosed area of approximately 200 microns.

The two surfaces of the tin-containing polyimide films were laminated together forming a monolithic polyimide laminate containing an encapsulated image design, without using an adhesive, by heating at a temperature of from 427 to 432° C. at a pressure of from 325 to 375 psi for 10 minutes.

Previous attempts to prepare similar encapsulated image designs using etched polyimide films laminated together with conventional FEP fluoropolymer adhesives were unsuccessful, resulting in polyimide laminates which failed at the seams when pressure and liquid was introduced into the etched enclosure.

EXAMPLE 2

Two, 125 microns thick Kapton® NA polyimide films, which did not contain added tin, were each surface etched to form a serpentine channel design about 20 microns in diameter which contained openings for valves for controlling the flow of liquid. Using conventional adhesives to bond the two etched polyimide film surfaces together resulted in adhesive flowing into and obstructing the serpentine channels or the valve openings.

Two, 125 microns thick Kapton® NA polyimide films containing 1200 ppm of tin were similarly etched in the same serpentine pattern design and were heat and pressure bonded together as described in Example 1, without the use of an adhesive, and provided a seamless monolithic polyimide laminate which maintained the integrity of the encapsulated image design during heat-pressure bonding.

EXAMPLE 3

Two, 125 microns thick Kapton® NA polyimide films containing 1200 ppm of tin were each chemically surface etched to form a design image. The etched films were washed with methylethyl ketone, rinsed with isopropyl alcohol and dried at 104° C. to remove any moisture.

The surfaces of the two etched films were superimposed and aligned in mirror relationship image against image and laminated between metal plates in a platen press which was preheated at 427° C. The films were allowed to attain a temperature of 427° C. and then a pressure of 350 psi was applied for 10 minutes to bond the two film sheets together.

What is claimed is:

1. A monolithic polyimide laminate without joints and seams comprising first and second layers of polyimide film, said polyimide film layers having inner and outer surfaces, said inner polyimide film surfaces having image designs formed thereon, wherein said inner imaged polyimide film surfaces are directly bonded to each other in mirror relationship image against image without the use of an adhesive, thereby forming an encapsulated image design containing flow channels, passageways and openings for the passage of gases and/or fluids, and wherein said polyimide film layers contain from 400 to 10,000 ppm of tin.

2. The monolithic polyimide laminate of claim 1 wherein the polyimide film layers comprise the polymerization-imidization reaction product of an aromatic tetracarboxylic dianhydride component and an aromatic diamine component.

3. The monolithic polyimide laminate of claim 2 wherein the aromatic tetracarboxylic dianhydride component comprises pyromellitic dianhydride and the aromatic diamine component comprises 4,4'-diaminodiphenyl ether.

4. The monolithic polyimide laminate of claim 2 wherein the aromatic tetracarboxylic dianhydride component comprises pyromellitic dianhydride and 3,3',4,4'-biphenyltetracarboxylic dianhydride and the aromatic diamine component comprises 4,4'-diaminodiphenyl ether and p-phenylenediamine.

5. The monolithic polyimide laminate of claim 1 wherein the polyimide film layers are the same and have a thickness of from 25 to 125 microns.

6. A process for preparing a monolithic polyimide laminate without joints and seams comprising the steps of:

(a) providing first and second layers of polyimide film said layers having inner and outer surfaces;

(b) forming image designs on said inner polyimide film surfaces;

(c) superimposing said inner imaged polyimide film surfaces in mirror relationship image against image; and (d) bonding said inner imaged polyimide surfaces directly to each other using heat and pressure and without the use of an adhesive, thereby forming an encapsulated image design containing flow channels, passageways and openings for the passage of gases and/or fluids, and wherein said polyimide film layers contain from 400 to 10,000 ppm of tin.

7. The process for preparing the monolithic polyimide laminate of claim 6 comprising forming image designs by chemical or laser etching of the inner polyimide surfaces.

8. The process for preparing the monolithic polyimide laminate of claim 6 wherein the opening forming the encapsulated image design is filled with a conductive metal or a conductive ink to provide conductive flow through the opening.

9. The process for preparing the monolithic polyimide laminate of claim 6 wherein the bonding of the inner imaged polyimide surfaces to each other is carried out by heating at a temperature of from 418° to 441° C. and at a pressure of from 250 to 450 psi.

10. The process for preparing the monolithic polyimide laminate of claim 6 wherein the polyimide film comprises pyromellitic dianhydride and 4,4'-diamino-diphenyl ether and contains from 1200 to 3500 ppm of tin.

* * * * *